United States Patent
Sinay et al.

(10) Patent No.: US 11,537,934 B2
(45) Date of Patent: Dec. 27, 2022

(54) SYSTEMS AND METHODS FOR IMPROVING THE INTERPRETABILITY AND TRANSPARENCY OF MACHINE LEARNING MODELS

(71) Applicant: Bluestem Brands, Inc., Eden Prairie, MN (US)

(72) Inventors: Marick Sinay, Manhattan Beach, CA (US); Damien Benveniste, Torrance, CA (US); Peng Jiang, Torrance, CA (US); Philip Remmele, El Segundo, CA (US); Junqing Wu, Playa Del Rey, CA (US); Mike Zhang, Fullerton, CA (US)

(73) Assignee: Bluestem Brands, Inc., Eden Prairie, MN (US)

( * ) Notice: Subject to any disclaimer, the term of this patent is extended or adjusted under 35 U.S.C. 154(b) by 1134 days.

(21) Appl. No.: 16/137,200

(22) Filed: Sep. 20, 2018

(65) Prior Publication Data
US 2020/0097439 A1    Mar. 26, 2020

(51) Int. Cl.
*G06N 20/00* (2019.01)
*G06K 9/62* (2022.01)
(Continued)

(52) U.S. Cl.
CPC ............. *G06N 20/00* (2019.01); *G06F 17/11* (2013.01); *G06K 9/6256* (2013.01); *G06N 3/08* (2013.01); *G06T 2207/20081* (2013.01)

(58) Field of Classification Search
None
See application file for complete search history.

(56) References Cited

U.S. PATENT DOCUMENTS 7,280,980 B1    10/2007  Hoadley et al.
9,185,095 B1    11/2015  Moritz et al.
(Continued)

FOREIGN PATENT DOCUMENTS

WO    2016070096 A1    5/2016
WO    2016160539 A1    10/2016
(Continued)

OTHER PUBLICATIONS

Antoine Mahul et al., "Training Feed-Forward Neural Networks with Monotonicity Requirements", Research Report RR-04-11, LIMOS / Blaise Pascal University (France), Jun. 2004, 14 pages.

*Primary Examiner* — Toan H Vu
(74) *Attorney, Agent, or Firm* — Faegre Drinker Biddle & Reath LLP

(57) ABSTRACT

Embodiments herein provide for a machine learning algorithm that generates models that are more interpretable and transparent than existing machine learning approaches. These embodiments identify, at a record level, the effect of individual input variables on the machine learning model. To provide those improvements, a reason code generator assigns monotonic relationships to a series of input variables, which are then incorporated into the machine learning algorithm as metadata. In some embodiments, the reason code generator creates records based on the monotonic relationships, which are used by the machine learning algorithm to generate predicted values. The reason code generator compares an original predicted value from the machine learning model to the predicted values from the machine learning model.

19 Claims, 4 Drawing Sheets

(51) Int. Cl.
*G06F 17/11* (2006.01)
*G06N 3/08* (2006.01)

(56) References Cited

U.S. PATENT DOCUMENTS

| | | |
|---|---|---|
| 10,133,980 B2 | 11/2018 | Turner et al. |
| 2002/0099649 A1 | 7/2002 | Lee et al. |
| 2005/0125339 A1 | 6/2005 | Tidwell et al. |
| 2007/0228148 A1 | 10/2007 | Rable |
| 2008/0275861 A1* | 11/2008 | Baluja ................. G06N 5/02 707/999.005 |
| 2008/0301075 A1 | 12/2008 | Bolt et al. |
| 2009/0024499 A1 | 1/2009 | Ribble |
| 2012/0066163 A1 | 3/2012 | Balls et al. |
| 2012/0109821 A1 | 5/2012 | Barbour et al. |
| 2012/0203708 A1 | 8/2012 | Psota et al. |
| 2012/0316981 A1 | 12/2012 | Hoover et al. |
| 2012/0317058 A1 | 12/2012 | Abhulimen |
| 2013/0231974 A1 | 9/2013 | Harris et al. |
| 2013/0332338 A1 | 12/2013 | Yan et al. |
| 2017/0308520 A1 | 10/2017 | Beahan, Jr. et al. |
| 2018/0276691 A1* | 9/2018 | Li ........................ G06N 3/0445 |
| 2018/0322406 A1 | 11/2018 | Merrill et al. |
| 2018/0365765 A1 | 12/2018 | Merrill et al. |
| 2019/0043070 A1 | 2/2019 | Merrill et al. |
| 2019/0340526 A1* | 11/2019 | Turner ................... G06N 3/105 |
| 2019/0362849 A1* | 11/2019 | Kozloski ............... G06N 5/022 |
| 2020/0090073 A1* | 3/2020 | Zhan ..................... G06N 20/00 |
| 2021/0127152 A1* | 4/2021 | Weinberg Harel .. H04N 21/252 |

FOREIGN PATENT DOCUMENTS

| | | |
|---|---|---|
| WO | 2016164680 A2 | 10/2016 |
| WO | 2018075213 A1 | 4/2018 |
| WO | 2018084867 A1 | 5/2018 |

\* cited by examiner

SYSTEMS AND METHODS FOR IMPROVING THE INTERPRETABILITY AND TRANSPARENCY OF MACHINE LEARNING MODELS

TECHNICAL FIELD

Embodiments of the present invention generally relate to improved machine learning models. In particular, certain embodiments relate to techniques for increasing the interpretability and transparency of machine learning models. These advancements in machine learning technology can be applied to generate accurate record level variable importance.

BACKGROUND

Generally speaking, there are various processes that rely on combining multiple input factors into an overall model. Many processes rely on machine learning techniques to generate the model, as machine learning algorithms can often perform well when generating predictive models.

Generally, machine learning models and advanced predictive analytics outperform traditional modeling techniques such as logistic regression, ordinary least squares, and even other linear techniques. While machine learning algorithms can increase model accuracy, existing machine learning techniques are less interpretable and less transparent, in that the impact of any individual factor on the model is largely obscured and cannot be readily identified. Thus, when facing a scenario with a relatively large number of input variables, existing modeling approaches require a choice between model accuracy and interpretability.

This tradeoff between accuracy and interpretability is particularly troublesome in certain modeling applications. For example, many credit rating systems rely on models to evaluate individuals. These models have become more sophisticated as the input variables have become more numerous. At the same time, these credit rating systems seek to provide interpretability and transparency at the record level, such as identifying a particular input variable or variables in the record that had a significant impact on the overall model for an individual. In particular, these credit rating systems employ reason codes or adverse action reason codes that identify various input variables that had an impact on why a particular credit score has been generated for an individual. For a specific example, adverse action reason codes can identify a high utilization rate of available credit or a certain number of non-payments as having a highly negative impact on the credit score for an individual. The adverse action reason codes can be provided with credit score reports or adverse action reports issued after denial of credit for the individual.

Thus, as discussed above, existing machine learning and advanced predictive techniques typically result in more complicated and less interpretable models. As a result, existing modeling techniques require a choice between model accuracy and interpretability. Stated differently, the structure of current machine learning technology results in models that are lacking in transparency and interpretability. This problem specifically arises from the technical construct of the machine learning algorithms. To address that technological shortcoming, embodiments of the present disclosure provide a solution rooted in machine learning technology, for example, providing for the use of monotonic relationships that override how existing machine learning algorithms operate, thereby creating more transparent and interpretable models, including record level variable importance. In this manner, these embodiments provide a technical solution to existing problems with current machine learning technology.

SUMMARY

Some embodiments of the present disclosure provide improved machine learning techniques that solve the tradeoff problem present in existing modeling technologies, including machine learning techniques. Specifically, these embodiments support the increased accuracy provided by machine learning algorithms while improving the interpretability and transparency of the resulting models and their predicted outputs (also called predicted variables or predicted values). For example, in some embodiments at least some of the input variables are assigned monotonic relationships as constraints prior to the machine learning process, including training the machine learning algorithm. In other embodiments, all of the input variables are assigned monotonic relationships. These monotonic relationships enable the machine learning algorithm to generate models of increased interpretability and transparency while largely preserving the predictive performance associated with machine learning techniques. Furthermore, some embodiments leverage these assigned monotonic relationships and the resulting model to determine the relative impact that each factor has on the model. To that end, some embodiments create a series of records, one for each input variable, in which the value of one input variable in each record is modified to generate the maximum predicted value, conditional on holding fixed the other input variables static at their observed values. Thus, these records are used to generate predicted values, using the same trained machine learning algorithm. The predicted values are compared against the original predicted value, with the differences for each predicted value from the original predicting value representing the impact of the corresponding input variable.

In one embodiment, a method is provided for determining record level variable importance for a machine learning model. The method includes receiving, using one or more processors, a plurality of input values corresponding to a plurality of input variables. Further, the method includes determining the machine learning model using a machine learning algorithm executed by the one or more processors, the machine learning algorithm utilizing the plurality of input values and a plurality of monotonic relationships assigned to the plurality of input variables to generate an original predicted value. The method further includes creating a plurality of input values by altering at least some of the input values based on the monotonic relationships assigned to their corresponding input variables. Also, the method includes determining a plurality of predicted values using the machine learning algorithm executed by the one or more processors, the machine learning algorithm utilizing the plurality of input values, the plurality of input values, and the monotonic relationships assigned to the plurality of input variables, wherein each predicted value is determined using one input value and each of the plurality of input values except for the input value that was altered to create the input value. The method further includes determining record level variable importance for the machine learning model based on the plurality of predicted values and the original predicted value.

In one example, the method further includes assigning a monotonic relationship of the plurality of monotonic relationships to an input variable of the plurality of input variables. In another example, each monotonic relationship of the plurality of monotonic relationships provides a directional constraint. In yet another example, determining record level variable importance includes generating at least one reason code. In still another example, the method further includes training the machine learning algorithm using a set of test records each having a plurality of input values corresponding to the plurality of input variables and using the plurality of monotonic relationships assigned to the plurality of input variables. In still yet another example, a number of predicted values in the plurality of predicted values equals a number of input variables. In a further example, creating the plurality of input values by altering at least some of the input values based on the monotonic relationships assigned to their corresponding input variables includes, for each of the at least some input values, altering the input value to generate a maximum original predicted value, conditional on holding fixed the other input values. In a yet further example, determining record level variable importance for the machine learning model includes creating a vector formed from differences between the original predicted value and each of the plurality of predicted values. In a still yet further example, the method further includes ranking the plurality of input variables based on the vector. In a variation, the method further includes outputting at least one reason code using the highest-ranking variable of the plurality of input variables.

In another embodiment, a method is provided for determining, at a record level, impacts of particular input variables on a machine learning model. The method includes receiving, using one or more processors, a present record having values for a plurality of input variables. Further, the method includes creating an input value for each of the plurality of input variables based on monotonic relationships assigned to the plurality of input variables. The method further includes determining a plurality of predicted values using the following iterative process, where i starts at 1: (A) creating an i-th record by incorporating the values in the present record and substituting the value for the i-th input variable in the present record for the corresponding input value; (B) generating an i-th predicted value using a machine learning algorithm executed by one or more processors, the machine learning algorithm utilizing the values for the plurality of input variables in the i-th record and the monotonic relationships assigned to the plurality of input variables; and (C) increasing i by one and repeating steps (A)-(C) until i reaches the total number of the plurality of input variables; and generating at least one record level reason code based on the plurality of predicted values and a predicted value for the present record.

In one example, the method further includes training the machine learning algorithm using the one or more processors, based on a plurality of training records each having values for the plurality of input variables and based on the monotonic relationships.

In yet another embodiment, a system is provided for automatically generating record level variable importance using a machine learning model. The system includes at least one processor, and one or more computer-readable media having computer-executable instructions embodied thereon, wherein, upon being executed by the at least one processor, the computer-executable instructions cause the at least one processor to: assign a monotonic relationship to each of a plurality of input variables, each monotonic relationship providing a directional constraint; receive a plurality of input values corresponding to the plurality of input variables; determine a target variable using a machine learning algorithm executed by the at least one processor, the machine learning algorithm utilizing the plurality of input values and the monotonic relationships assigned to the plurality of input variables; create a plurality of input values by altering at least some of the input values according to the monotonic relationships assigned to their corresponding input variables; determine a plurality of target values using the machine learning algorithm executed by the one or more processors, the machine learning algorithm utilizing the plurality of input values, the plurality of input values, and the monotonic relationships assigned to the plurality of input variables, wherein each model is determined using one input value and each of the plurality of input values except for the input value that was altered to create that input value; and determine record level variable importance for the interpretable machine learning model based on the plurality of target values and the target variable.

In one example, the computer-executable instructions cause the at least one processor to calculate differences between the target value and each of the target values. In another example, the computer-executable instructions cause the at least one processor to generate a vector incorporating the differences between the target value and each of the target values. In yet another example, the computer-executable instructions cause the at least one processor to rank the plurality of input variables based on the vector.

In still another embodiment, one or more computer-readable media is provided having computer-executable instructions embodied thereon, the computer-executable instructions configured to cause at least one processor executing the instruction to perform the following: assign a monotonic relationship to each of a plurality of input variables, each monotonic relationship providing a directional constraint; receive, a plurality of input values for a record, the input values corresponding to the plurality of input variables; and determine a target value using a machine learning algorithm executed by the at least one processor, the machine learning algorithm utilizing the plurality of input values and the monotonic relationships assigned to the plurality of input variables.

In one example, the computer-executable instructions are further configured to cause the at least one processor to perform the following: receive a set of training records; and train the machine learning algorithm using the set of training records and the monotonic relationships. In another example, the computer-executable instructions are further configured to cause the at least one processor, to perform the following: create a plurality of input values by altering each of the input values according to the monotonic relationships assigned to their corresponding input variables; determine a plurality of target values using the machine learning algorithm executed by the at least one processor, the machine learning algorithm utilizing the plurality of input values, the plurality of input values, and the monotonic relationships assigned to the plurality of input variables, wherein each target value is determined using one input value and each of the plurality of input values except for the input value that was altered to create the input value; and generate at least one reason code based on the plurality of target values and the record model.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

Figure 1:
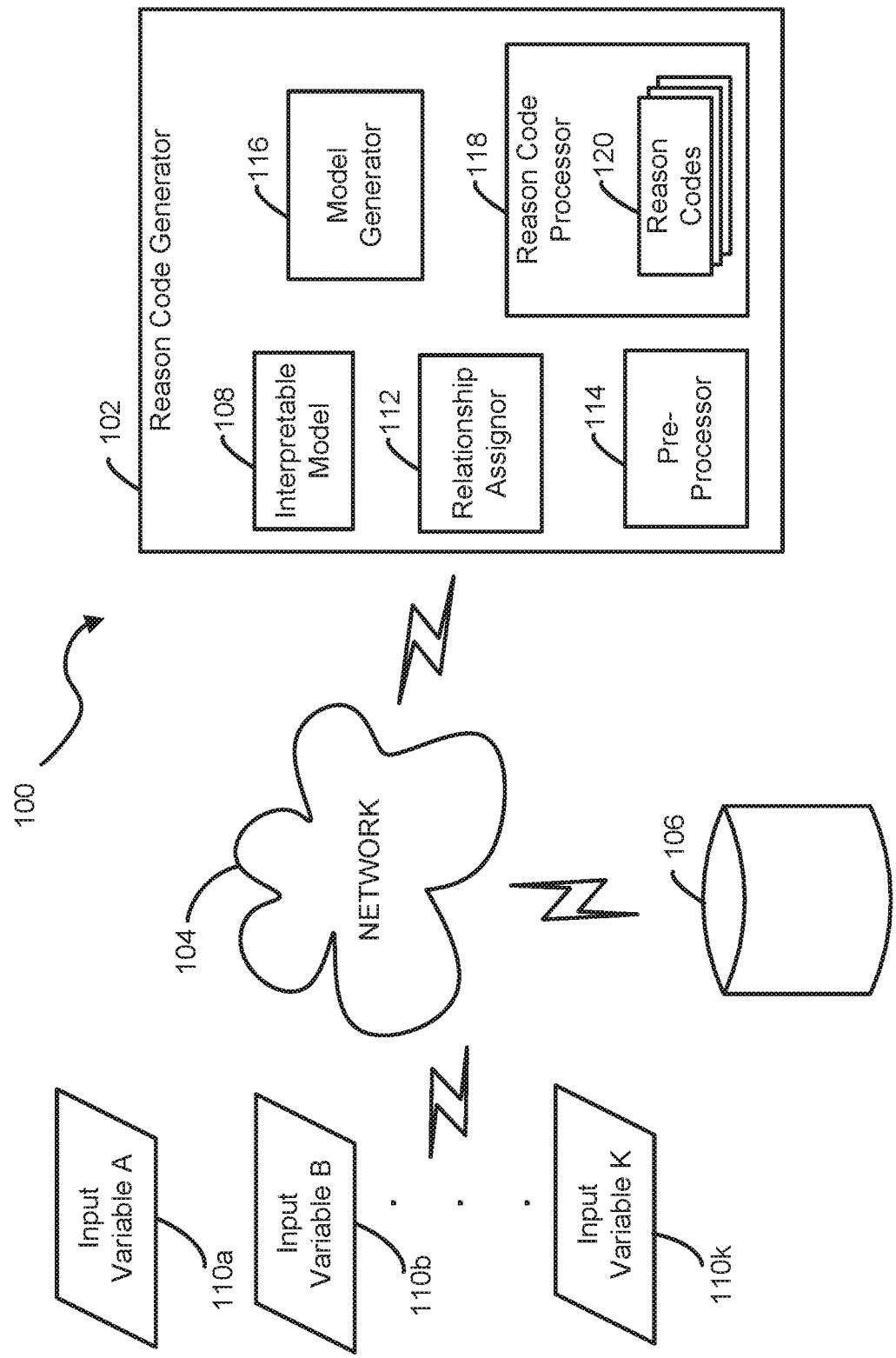
FIG. 1 is a schematic diagram of an illustrative reason code generation system, in accordance with embodiments of the subject matter disclosed herein.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

FIG. 1 shows an illustrative reason code generation system 100 featuring a reason code generator 102 in accordance with embodiments of the disclosure. Additionally, various components depicted in FIG. 1 may be, in various embodiments, integrated with various ones of the other components depicted therein (and/or components not illustrated), all of which are considered to be within the ambit of the subject matter disclosed herein. Any number of components of the system 100 may be implemented using one or more computing devices. For example, the reason code generator 102 may be implemented on one or more computing devices, such as a laptop, smart phone, or server system, which include one or more processors executing instructions stored in a tangible, non-transitory storage medium. The reason code generator may be connected to a network 104 and a database 106 (either directly or via the network 104, as shown in FIG. 1).

The reason code generator 102 is configured to generate an interpretable model 108. In some embodiments, the interpretable model 108 is represented as a target variable. The reason code generator 102 can be programmed software applications or hardware circuits running on a microprocessor to perform the reason code generation process. The reason code generator 102 may be configured to work with any type of computer network having a collection of computers, servers, and other hardware interconnected by communication channels, such as the Internet, Intranet, Ethernet, LAN, etc. In one embodiment, the reason code generator 102 interfaces with the network 104, such as a wireless communication facility (e.g., a Wi-Fi access point), and performs an automated information collection process for collecting the relevant information that is desired by a user or other systems. Other similar networks known in the art are also contemplated. In another embodiment, the reason code generator 102 may be configured to work with no computer network between internal components of the system 100. In some embodiments, all relevant information or data can be stored in the database 106, e.g., as a non-transitory data storage device and/or a machine-readable data storage medium carrying computer-readable information and/or computer-executable instructions, for retrieval by the reason code generator 102 and other associated systems and programs.

The reason code generator 102 generates the interpretable model 108 using values for a plurality of input variables 110a-111k (collectively 110) that can be received over a network 104. In other embodiments, the values for the plurality of input variables can be input directly into the reason code generator. In one embodiment, the values for the plurality of input variables 110 include values for one or more score influencing input variables that adversely or favorably affect the interpretable model 108. The interpretable model 108 may be a target variable or predicted value 108 in some embodiments, such as a credit score, and the influencing input variables in these embodiments can include input variables such as a number of missed payments and a number of credit score inquiries with a predetermined time period.

In one embodiment, the reason code generator 102 includes a relationship assignor 112, a pre-processor 114, a model generator 116, and a reason code processor 118. The relationship assignor 112 is configured to assign a monotonic relationship having a directional constraint for each input variable 110a-110k. In one example, the monotonic relationship can include a non-increasing directional constraint representing a negative relationship between a corresponding input variable 110a-110k and the interpretable model. For example, a negative directional constraint can be applied to a particular input variable (e.g., 110a), which will constrain how that variable is incorporated into the model 108 through the machine learning process. For a particular example, an input variable for the number of missed payments could be assigned a monotonic relationship that imposes a negative directional constraint for the resulting machine learning model.

In some embodiments, the monotonic relationship assignments for the input variables 110 are designed to avoid saw-tooth point patterns (which could also be called non-monotonic point patterns) in the predicted values. In one example, the monotonic relationships are weakly monotonic directional relationships between an input variable and the predicted output. In this manner, the reason code generator 102 can remove the possibility of saw-tooth point patterns from occurring.

The monotonic relationship can include a non-decreasing directional constraint representing a positive relationship between the corresponding input variable 110a-110k and the interpretable model 108. For example, the monotonic relationship includes the positive directional constraint representing the score influencing factor that favorably affects the interpretable model 108. Thus, when the number of timely payments is greater than a predetermined threshold, the positive directional constraint is considered to be non-decreasing.

Such assignment of negative or positive relationships between the corresponding input variables 110a-110k and the interpretable model 108 can be achieved when defining of each input variable and/or an associated default encode description. For example, a look-up table having the default relationship between the corresponding input variable 110a-110k and the interpretable model 108 is provided in the database 106 for retrieval by the relationship assignor 112.

In another example, the monotonic relationship between the corresponding input variable 110a-110k and the interpretable model 108 is weighted, e.g., based on empirical or historical data. In another embodiment, the negative or positive directional constraint of the monotonic relationship can be weighted based on a type of the score influencing factor associated with each input variable 110a-110k. For example, a higher weight can be applied to the score influencing factor of "too many consumer finance company accounts" than the one of "a length of time accounts have been established." Other suitable score influencing input variables, such as "too many accounts with balances," are also contemplated to suit different applications.

In some embodiments, the pre-processor 114 applies a set of constraints to the input variables to account for situations where the values for the input variables could conflict with the assigned monotonic relationships. For example, in some situations the values for a particular input variable could vary along a range of, e.g., 0-9,999,999. However, the values 9,999,990 through 9,999,999 could represent default encode values that identify particular situations, and not simply linear increases above the value 9,999,989. In such situations, the pre-processor 114 modifies the values for the input variables to account for such default encode values. In other situations, the pre-processor modifies the directional constraints to account for such default encode values. For example, using the example above, if the input variable would generally be assigned a positive directional constraint and if a default encode value of, e.g., 9,999,990 represents a situation in which the input factor would have a maximum positive impact, then the pre-processor could apply the directional constraint over the range from 0-9,999,990. In this manner, the pre-processing can ensure appropriate treatment for each input variable 110a-110k, including any default encode descriptions embedded in the values for those input variables. This pre-processing can be achieved programmatically using a proprietary program code base or using a pre-programmed circuit depending on the application.

The model generator 116 is configured to determine the interpretable model 108 starting with a machine learning algorithm such as XGBoost. As part of this process, the model generator trains the machine learning algorithm using a series of records as training data, each record including values for the input variables 110 as well as the target variable or output for that record. In addition, the monotonic relationships assigned to the input variables are also incorporated into the training data, for example, as meta-data. This approach accommodates both classification for a categorical model or target variable (108) or regression for a continuous model or target variable (108).

Once the machine learning algorithm is trained, new sets of records can be analyzed using that trained machine learning algorithm. The monotonic relationships assigned to the input variables 110 are also applied during this process, so that the resulting model continues to be an interpretable model 108.

In some embodiments a gradient boosting technique is used for accommodating both regression and classification of the model 108 for each input variable 110a-110k. For example, the classification is associated with the model for a categorical target variable, and the regression is associated with the model for a continuous target variable. In one embodiment, based on the models for the input variables 110, the score generator 116 determines the value of the target variable or model 108. In another embodiment, the value of the target variable or model 108 (e.g., the credit score) is calculated or determined during a batch process or immediately in real time.

The reason code processor 118 is configured to generate one or more reason codes 120 for the target variable 108 based on a series of predicted values created by the machine learning algorithm. Detailed description of this process is provided below in the description related to FIGS. 3-4. These reason codes 120 reflect insight into the model at the record level.

Figure 2:
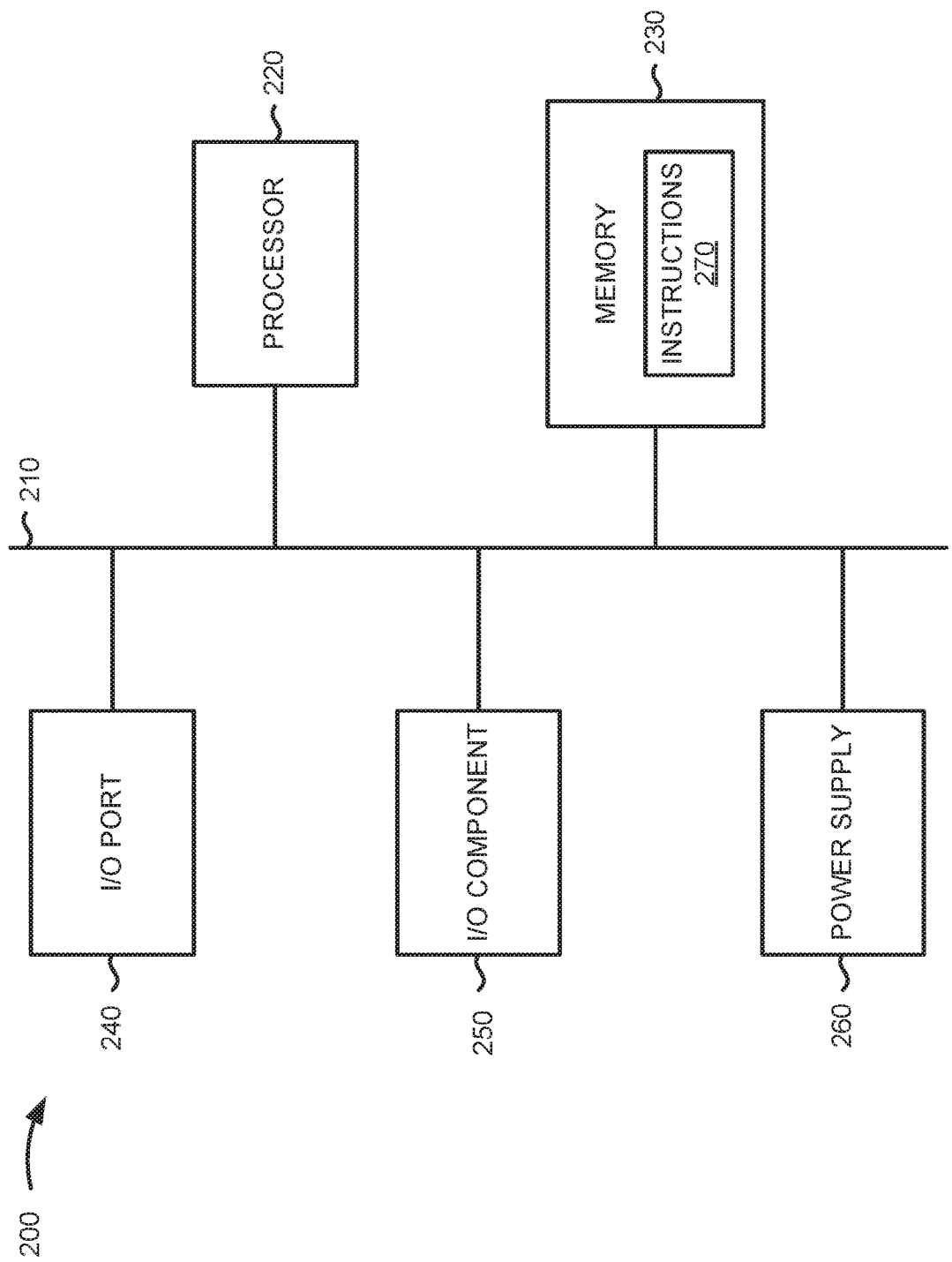
FIG. 2 is a block diagram depicting an illustrative computing device, in accordance with embodiments of the subject matter disclosed herein.

FIG. 2 is a block diagram depicting an illustrative computing device 200 incorporated in the system 100 in accordance with embodiments of the disclosure. The computing device 200 may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "smartphones," "general-purpose graphics processing units (GPGPUs)," and the like, all of which are contemplated within the scope of FIGS. 1 and 2, with reference to various components of the system 100 and/or computing device 200.

In embodiments, the computing device 200 includes a bus 210 that, directly and/or indirectly, couples the following devices: a processor 220, a memory 230, an input/output (I/O) port 240, an I/O component 250, and a power supply 260. Any number of additional components, different components, and/or combinations of components may also be included in the computing device 200. The I/O component 250 may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 210 represents what may be one or more busses (such as, for example, an address bus, data bus, or combination thereof). Similarly, in embodiments, the computing device 200 may include a number of processors 220, a number of memory components 230, a number of I/O ports 240, a number of I/O components 250, and/or a number of power supplies 260. Additionally, any number of these components, or combinations thereof, may be distributed and/or duplicated across a number of computing devices.

In embodiments, the memory 230 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory 230 stores computer-executable instructions 270 for causing the processor 220 to implement aspects of embodiments of system components discussed herein and/or to perform aspects of embodiments of methods and procedures discussed herein.

The computer-executable instructions 270 may include, for example, computer code, machine-useable instructions, and the like such as, for example, program components capable of being executed by one or more processors 220 associated with the computing device 200. Program components may be programmed using any number of different programming environments, including various languages, development kits, frameworks, and/or the like. Some or all of the functionality contemplated herein may also, or alternatively, be implemented in hardware and/or firmware.

The illustrative computing device 200 shown in FIG. 2 is not intended to suggest any limitation as to the scope of use or functionality of embodiments of the present disclosure. The illustrative computing device 200 also should not be interpreted as having any dependency or requirement related to any single component or combination of components illustrated therein. Additionally, various components depicted in FIG. 2 may be, in embodiments, integrated with various ones of the other components depicted therein (and/or components not illustrated), all of which are considered to be within the ambit of the present disclosure.

Figure 3:
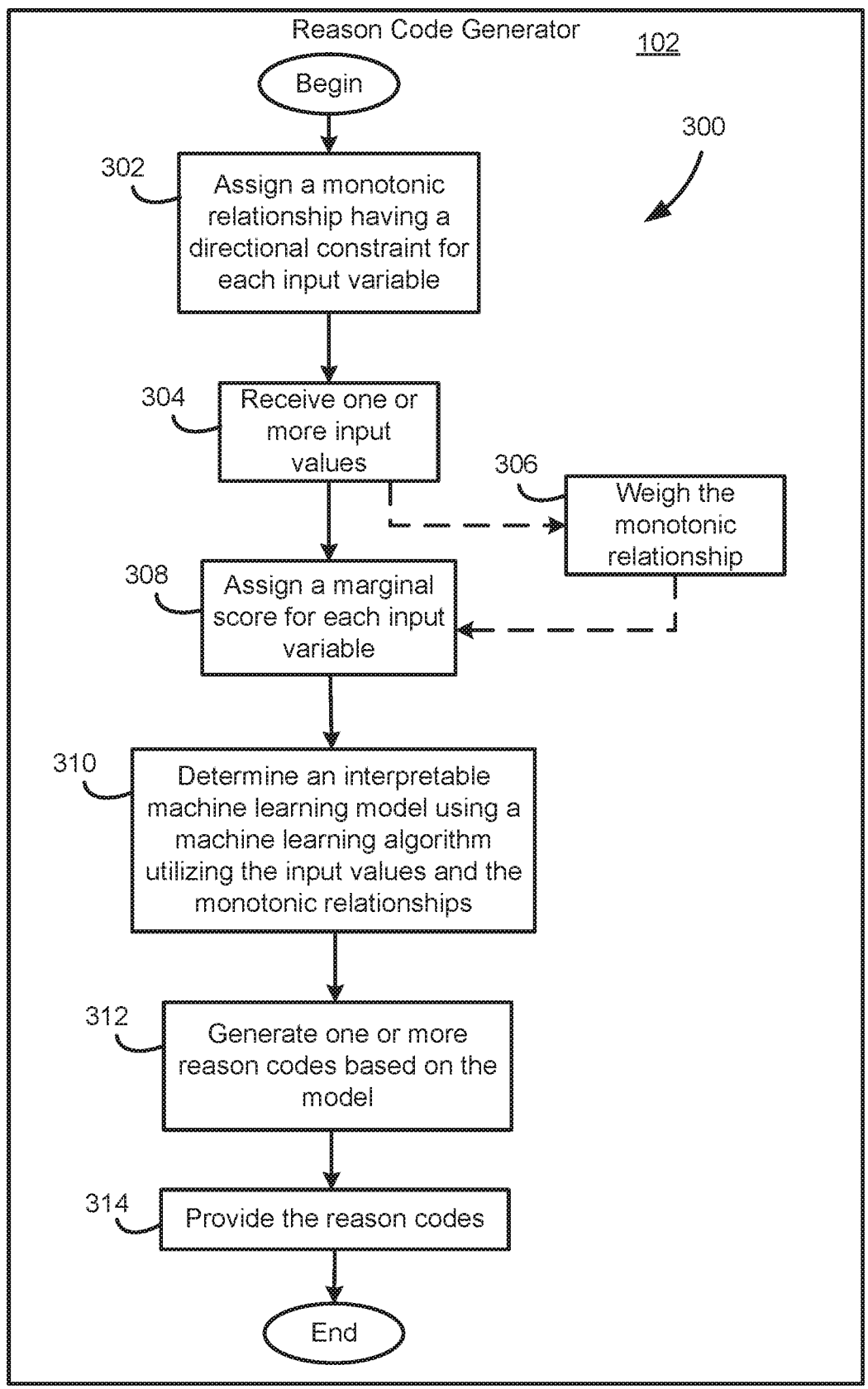
FIG. 3 is a flow chart depicting an illustrative reason code generation process of the system of FIG. 1, in accordance with embodiments of the subject matter disclosed herein.

FIG. 3 shows an illustrative reason code generation process of the reason code generation system 100 in accordance with embodiments of the subject matter disclosed herein. In FIG. 3, a method 300 of performing the automated reason code generation process is shown using the reason code generator 102. Initially, there may be one or more input variables 110a-110k. The number of input variables can vary widely, as the machine learning techniques discussed herein can include hundreds or thousands of input variables. In one embodiment, k represents a number of possible score influencing input variables for generating the machine learning model.

At block 302, the relationship assignor 112 assigns a monotonic relationship having a directional constraint for each input variable 110a-110k. In one embodiment, the directional constraint can be a positive number representative of a positive relationship between a corresponding input variable 110a-110k and a target variable or predicted value 108. In another embodiment, the directional constraint can be a negative number representative of a negative relationship between the corresponding input variables 110a-110k and the target variable or model 108.

At block 304, the relationship assignor 112 receives a plurality of input values corresponding to the input variables 110. For example, an input value can be an integer value of for the input variable 110a relating to the number of missed payments during a specific duration. Other suitable input variables and values are also contemplated to suit the application.

At block 306, the relationship assignor 112 optionally weighs the monotonic relationship between the corresponding input variable 110a-110k and the target variable or model 108. For example, the negative or positive directional constraint of the monotonic relationship can be weighted based on a type of the score influencing factor associated with each input variable 110a-110k.

At block 308, the pre-processor 114 assigns a marginal score for each input variable 110a-110k. The marginal score refers to a score value applied to each input variable to increase or decrease a final value of the target variable or predicted value 108. For example, the marginal score is assigned based on the default encode descriptions associated with the corresponding input variables 110.

At block 310, the score generator 116 determines the interpretable machine learning model using a machine learning algorithm. In some embodiments, this includes training the machine learning algorithm using a set of historical records in combination with the monotonic relationships assigned to the input variables. Once the algorithm is trained, the machine learning algorithm utilizes the plurality of input values for a present record and the monotonic relationships assigned to the plurality of input variables to determine the target variable or predicted value 108.

At block 312, the reason code processor 118 generates one or more reason codes 120 for the target variable 108 based on the model. In some embodiments, this step includes iterative evaluations like those described below in paragraphs related to FIG. 4.

At block 314, the reason code processor 118 provides the reason codes 120 associated with the target variable 108 to the individual or any other systems as desired. For example, the reason codes 120 can be printed on the credit score report for the individual or can be transmitted to other systems associated with the target variable 108.

Figure 4:
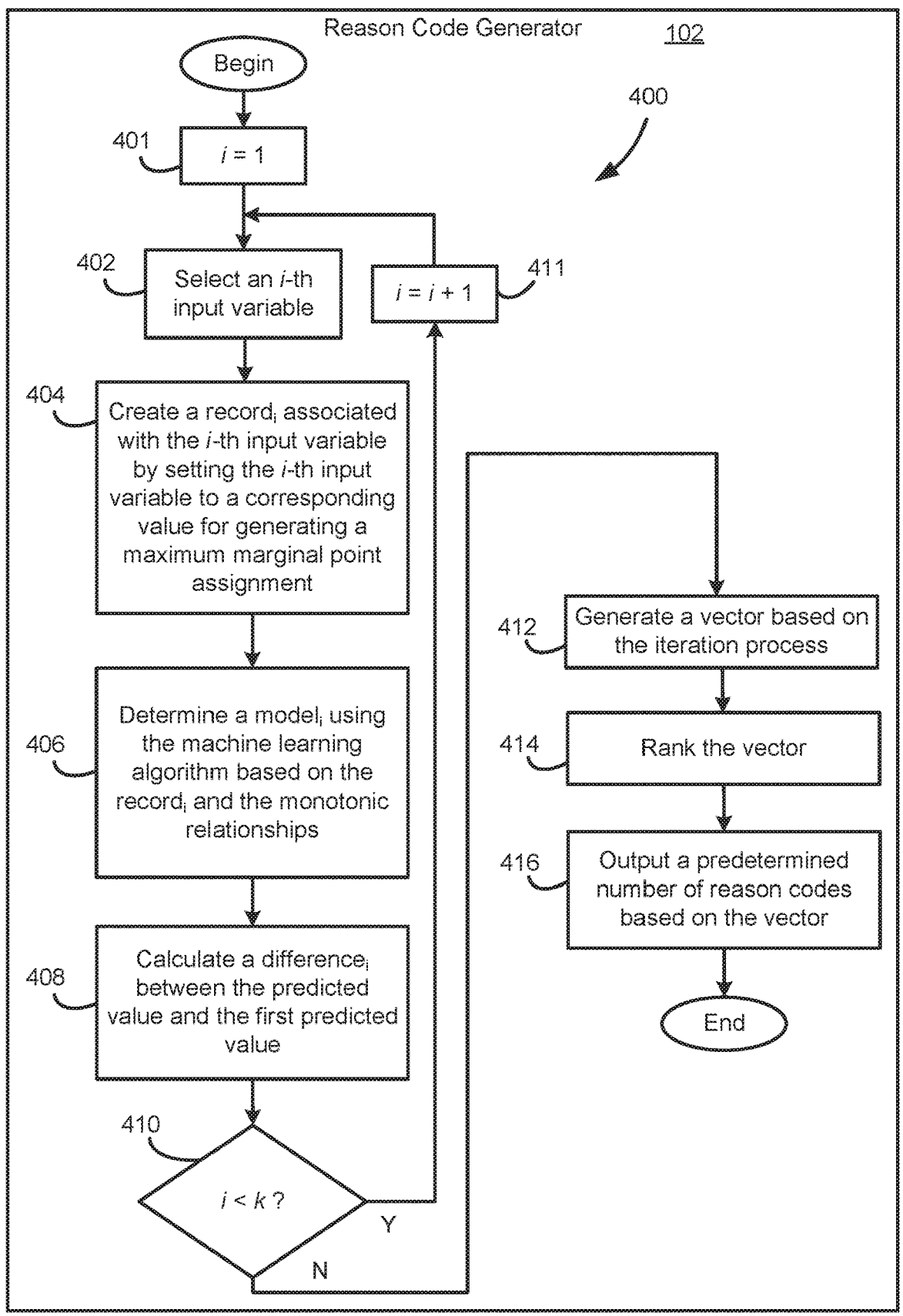
FIG. 4 is a flow chart depicting the illustrative reason code generation process of FIG. 3 using a reason code generator, in accordance with embodiments of the subject matter disclosed herein.

FIG. 4 shows an illustrative reason code generation process of block 312 in FIG. 3, in accordance with embodiments of the subject matter disclosed herein. In FIG. 4, a method 400 of iteratively calculating the k predicted values. At block 401, the reason code processor 118 initially sets a value of i to 1. During the process, blocks 402-410 are iteratively repeated to create an i-th record.

At block 402, the reason code processor 118 selects the first input variable (e.g., 110a) from the k input variables and maintains the rest of input variables (e.g., 116b-116k) static. It is advantageous that holding the input variables 110b-110k static or unchanged from their original values allows the method 400 to control for the particular input variable.

At block 404, the reason code processor 118 creates a first record by altering the value of the first input variable to generate the maximum predicted value, based on the monotonic relationship assigned to that input variable and conditional on holding fixed the other input variables static at their observed values. The rest of that first record includes the unchanged values for the remaining input variables. For cases of the monotonic relationship imposing a negative directional constraint on the input variable, the corresponding value can be set to a smallest possible value of that input variable. For example, if the i-th input variable is associated with a number of missed payments, the corresponding value can be set to zero. For cases of the monotonic relationship imposing a positive directional constraint on the input variable, the corresponding value can be set to a largest possible value of that input variable. For example, if the i-th input variable is associated with a number of timely payments, the corresponding value can be set to a substantially large number (e.g., infinity or a large enough number that the resulting effect is effectively as if the number were infinity) representing that the payments have always been timely.

In another embodiment, the value for the input variable can be set to a mean or average value for that input variable. For example, the mean or average value can be determined based on the empirical or historical data retrieved from the database 110. Other suitable alterations such as using a sample mean from a statistical population, can also be contemplated to suit different applications.

At block 406, the reason code processor 118 determines a first predicted value using the machine learning algorithm, the first record, and the monotonic relationships. At block 408, the reason code processor 118 calculates a difference between the predicted value 108 determined at block 310 in FIG. 3 using the original record (with all of the original values for the input variables) and the first predicted value created with the first record (with the altered value for the first input variable and the original values for the remaining input variables). The difference correlates to the effect that the first input variable had on the overall model.

At block 410, when i is less than k, the method proceeds to block 402 to continue the iteration for the rest of k input variables 106b-106k. For example, if the first input variable 1061 is processed but there are four more input variables 1062-1065 left for the process, then the method continues to create the records associated with the input variables 1062-1065. Otherwise, the method proceeds to block 412. In one embodiment, the iteration can be performed using a parallel or concurrent computing technique known in the art. For example, hardware parallel computing techniques using multi-core or multi-processor computers, or software parallel computing techniques are contemplated.

At block 411, the reason code processor 118 increases i by one until i reaches a total number of the plurality of input variables. In this example, when i reaches the value of k, then control proceeds to block 412. In some embodiments, the process can repeat for less than all of the input variables.

At block 412, the reason code processor 118 generates a vector of numerical values of length k based on the iteration process performed by the reason code processor 118. The vector includes the difference for each input variable 110a-110k.

At block 414, the reason code processor 118 ranks an order of each i-th input variable 1101 in the vector. For example, the input variable 1101 having the highest impact on the model is ranked at top of the order, and the input variable 1101 having the lowest impact on the model is ranked at bottom of the order. Other suitable ranking techniques, such as a data transformation from numerical differences to specific ranks, can be used to suit different applications.

At block 416, based on the ranking process, a predetermined number (e.g., top three in ranking) of reason codes related to the corresponding input variables 110 are selected by the reason code processor 118 for reporting or output. In other words, the reason codes selected through this process identify, at a record level, the effects of specific input variables on the overall model. In this manner, this improvement to machine learning technology creates increased interpretability and transparency over existing machine learning processes. Accordingly, as a skilled artisan will appreciate, the techniques disclosed herein provide specific improvements to machine learning technology.

As the terms are used herein with respect to measurements (e.g., dimensions, characteristics, attributes, components, etc.), and ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

As used herein in association with values (e.g., terms of magnitude, measurement, and/or other degrees of qualitative and/or quantitative observations that are used herein with respect to characteristics (e.g., dimensions, measurements, attributes, components, etc.) and/or ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

We claim:

1. A method for determining record level variable importance for a machine learning model, the method comprising:
   receiving, using one or more processors, a plurality of input values corresponding to a plurality of input variables;
   determining the machine learning model using a machine learning algorithm executed by the one or more processors, the machine learning algorithm utilizing the plurality of input values and a plurality of monotonic relationships assigned to the plurality of input variables to generate an original predicted value;
   creating a plurality of input values by altering at least some of the input values based on the monotonic relationships assigned to their corresponding input variables;
   determining a plurality of predicted values using the machine learning algorithm executed by the one or more processors, the machine learning algorithm utilizing the plurality of input values, the plurality of input values, and the monotonic relationships assigned to the plurality of input variables, wherein each predicted value is determined using one input value and each of the plurality of input values except for the input value that was altered to create the input value; and
   determining record level variable importance for the machine learning model based on the plurality of predicted values and the original predicted value.

2. The method of claim 1, further comprising assigning a monotonic relationship of the plurality of monotonic relationships to an input variable of the plurality of input variables.

3. The method of claim 1, wherein each monotonic relationship of the plurality of monotonic relationships provides a directional constraint.

4. The method of claim 1, wherein determining record level variable importance includes generating at least one reason code.

5. The method of claim 1, further comprising training the machine learning algorithm using a set of test records each having a plurality of input values corresponding to the plurality of input variables and using the plurality of monotonic relationships assigned to the plurality of input variables.

6. The method of claim 1, wherein a number of predicted values in the plurality of predicted values equals a number of input variables.

7. The method of claim 1, wherein creating the plurality of input values by altering at least some of the input values based on the monotonic relationships assigned to their corresponding input variables includes, for each of the at least some input values, altering the input value to generate a maximum original predicted value, conditional on holding fixed the other input values.

8. The method of claim 1, wherein determining record level variable importance for the machine learning model includes creating a vector formed from differences between the original predicted value and each of the plurality of predicted values.

9. The method of claim 8, further comprising ranking the plurality of input variables based on the vector.

10. The method of claim 9, further comprising outputting at least one reason code using the highest-ranking variable of the plurality of input variables.

11. A method for determining, at a record level, impacts of particular input variables on a machine learning model, the method comprising:
   receiving, using one or more processors, a present record having values for a plurality of input variables;
   creating an input value for each of the plurality of input variables based on monotonic relationships assigned to the plurality of input variables;
   determining a plurality of predicted values using the following iterative process, where i starts at 1:
     (A) creating an i-th record by incorporating the values in the present record and substituting the value for the i-th input variable in the present record for the corresponding input value;
     (B) generating an i-th predicted value using a machine learning algorithm executed by one or more processors, the machine learning algorithm utilizing the values for the plurality of input variables in the i-th record and the monotonic relationships assigned to the plurality of input variables; and
     (C) increasing i by one and repeating steps (A)-(C) until i reaches the total number of the plurality of input variables; and
   generating at least one record level reason code based on the plurality of predicted values and a predicted value for the present record.

12. The method of claim 11, further comprising:
   training the machine learning algorithm using the one or more processors, based on a plurality of training records each having values for the plurality of input variables and based on the monotonic relationships.

13. A system for automatically generating record level variable importance using a machine learning model, the system comprising:
   at least one processor; and
   one or more computer-readable media having computer-executable instructions embodied thereon, wherein, upon being executed by the at least one processor, the computer-executable instructions cause the at least one processor to:
     (A) assign a monotonic relationship to each of a plurality of input variables, each monotonic relationship providing a directional constraint;
     (B) receive a plurality of input values corresponding to the plurality of input variables;
     (C) determine a target variable using a machine learning algorithm executed by the at least one processor, the machine learning algorithm utilizing the plurality of input values and the monotonic relationships assigned to the plurality of input variables;
     (D) create a plurality of input values by altering at least some of the input values according to the monotonic relationships assigned to their corresponding input variables;
     (E) determine a plurality of target values using the machine learning algorithm executed by the one or more processors, the machine learning algorithm utilizing the plurality of input values, the plurality of input values, and the monotonic relationships assigned to the plurality of input variables, wherein each model is determined using one input value and each of the plurality of input values except for the input value that was altered to create that input value; and
     (F) determine record level variable importance for the interpretable machine learning model based on the plurality of target values and the target variable.

14. The system of claim 13, wherein the computer-executable instructions cause the at least one processor to calculate differences between the target value and each of the target values.

15. The system of claim 13, wherein the computer-executable instructions cause the at least one processor to generate a vector incorporating the differences between the target value and each of the target values.

16. The system of claim 15, wherein the computer-executable instructions cause the at least one processor to rank the plurality of input variables based on the vector.

17. One or more non-transitory computer-readable storage media having computer-executable instructions embodied thereon, the computer-executable instructions configured to cause at least one processor executing the instruction to perform the following:
   assign a monotonic relationship to each of a plurality of input variables, each monotonic relationship providing a directional constraint;
   receive, a plurality of input values for a record, the input values corresponding to the plurality of input variables; and
   determine a target value using a machine learning algorithm executed by the at least one processor, the machine learning algorithm utilizing the plurality of input values and the monotonic relationships assigned to the plurality of input variables.

18. The one or more non-transitory computer-readable storage media of claim 17, wherein the computer-executable instructions are further configured to cause the at least one processor to perform the following:
   receive a set of training records; and
   train the machine learning algorithm using the set of training records and the monotonic relationships.

19. The one or more non-transitory computer-readable storage media of claim 17, wherein the computer-executable instructions are further configured to cause the at least one processor, to perform the following:
   create a plurality of input values by altering each of the input values according to the monotonic relationships assigned to their corresponding input variables;
   determine a plurality of target values using the machine learning algorithm executed by the at least one processor, the machine learning algorithm utilizing the plurality of input values, the plurality of input values, and the monotonic relationships assigned to the plurality of input variables, wherein each target value is determined using one input value and each of the plurality of input values except for the input value that was altered to create the input value; and
   generate at least one reason code based on the plurality of target values and the record model.

* * * * *